United States Patent [19]

Martin

[11] Patent Number: 4,681,215

[45] Date of Patent: * Jul. 21, 1987

[54] CONVEYOR ROLLER AND BEARING ASSEMBLY WITH EXTERNAL SUPPORT

[75] Inventor: Donald E. Martin, Waukesha, Wis.

[73] Assignee: Rexnord Inc., Brookfield, Wis.

[*] Notice: The portion of the term of this patent subsequent to Mar. 25, 2003 has been disclaimed.

[21] Appl. No.: 811,612

[22] Filed: Dec. 20, 1985

Related U.S. Application Data

[63] Continuation-in-part of Ser. No. 706,698, Feb. 28, 1985, Pat. No. 4,577,747.

[51] Int. Cl.$^4$ .............................................. B65G 39/10
[52] U.S. Cl. ..................................... 198/843; 193/37; 384/222; 29/116 R
[58] Field of Search ............... 198/843, 842, 780, 781, 198/785, 789, 842, 843; 193/37; 384/222, 296, 906; 29/110, 116 R

[56] References Cited

U.S. PATENT DOCUMENTS

| | | | |
|---|---|---|---|
| 1,716,448 | 6/1929 | Langsdorf | 198/789 |
| 2,529,684 | 11/1950 | Gass | 198/184 |
| 3,110,526 | 11/1963 | Sternlight | 384/222 X |
| 3,181,688 | 5/1965 | Schermer | 198/789 |
| 3,353,644 | 11/1967 | McNash et al. | 193/37 |
| 3,770,103 | 11/1973 | Ball et al. | 198/780 X |
| 3,877,565 | 4/1975 | Werntz | 198/781 |
| 3,894,323 | 7/1975 | Hamlen | 29/116 R |
| 3,994,380 | 11/1976 | Hope et al. | 198/780 X |
| 4,078,641 | 3/1978 | Payne | 193/37 |
| 4,078,642 | 3/1978 | Payne | 193/37 |
| 4,103,769 | 8/1978 | Jorgensen | 198/781 |
| 4,213,523 | 7/1980 | Frost et al. | 193/37 |
| 4,238,029 | 12/1980 | Pirro, Jr. | 198/781 |
| 4,279,559 | 7/1981 | Stumpf | 414/431 |
| 4,325,474 | 4/1982 | Rae | 198/781 |
| 4,577,747 | 3/1986 | Martin | 198/500 |

FOREIGN PATENT DOCUMENTS 0061893  10/1982  European Pat. Off. .............. 193/37

Primary Examiner—Joseph E. Valenza
Assistant Examiner—D. Glenn Dayoan
Attorney, Agent, or Firm—William L. Falk

[57] ABSTRACT

A conveyor roller and bearing arrangement rotatable about a pair of fixed stub axles lying between spaced side frame members includes a pair of self-aligning bearing assemblies in each end of the roller. Each bearing assembly includes an inner bearing race mounted on one of the stub axles, an outer bearing race rotatably mounted on the inner bearing race and an outer cushioning sleeve secured to the roller and outer bearing race for maintaining axial alignment between the inner and outer bearing races. A roller support assembly is positioned between the frame members to provide external support for the roller and cooperate with the bearing assemblies and stub axles to reduce the bending influence of the roller under loads.

9 Claims, 10 Drawing Figures

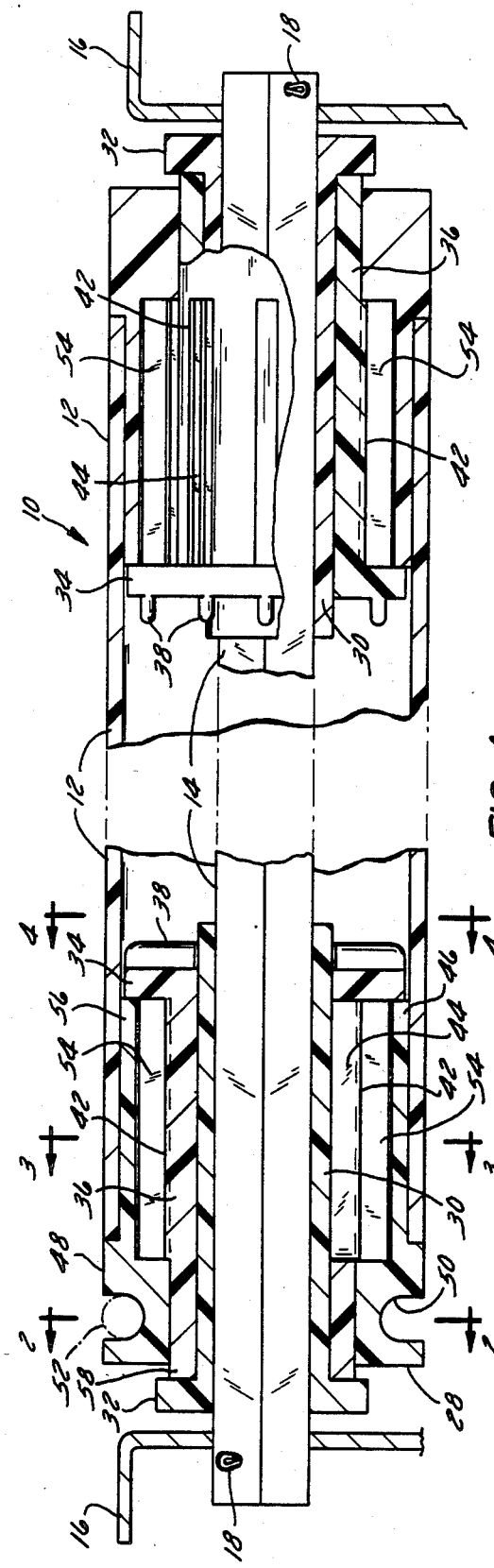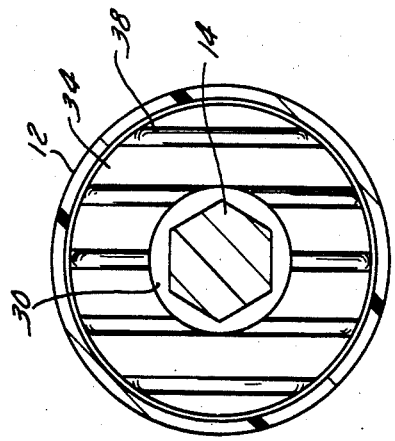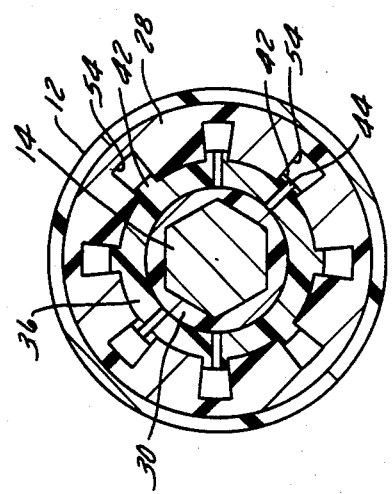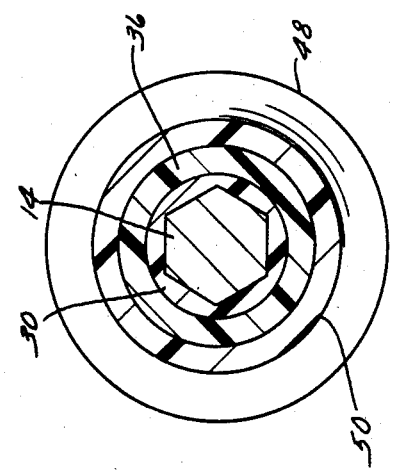

CONVEYOR ROLLER AND BEARING ASSEMBLY WITH EXTERNAL SUPPORT

CROSS-REFERENCE

This application is a continuation-in-part of application Ser. No. 706,698, filed Feb. 28, 1985, now U.S. Pat. No. 4,577,747.

BACKGROUND OF THE INVENTION

The present invention relates to conveyor rollers of the type which rotate on fixed axles or shafts and have internally mounted bearings at each end, and more particularly relates to conveyor rollers suitable for use where dust and moisture create a corrosive environment, yet conveyor cleanliness is of prime concern.

Examples of applications for the aforementioned type of conveyor rollers include food and beverage handling facilities. In such applications, under normal operating conditions, each roller is subjected to periodic loading and subsequent axle misalignment as a package travels across a conveyor. However, during periods of increased production, each roller may be subjected to higher speeds and almost continual load and axle misalignment.

Conventional conveyor rollers utilize metallic journal bearings, sleeve bearings, or antifriction bearings such as ball bearings which are subject to misalignment or a loss of bearing surface contact when the roller axle deflects under heavy and/or impact loads. Bearings may "walk" or move within the roller under these overload conditions. In the case of ball bearings, a deflection of the roller axle of only $1\frac{1}{2}°$ causes the individual balls to become pinched between the inner and outer races. This additional load on the bearing causes a significant increase in friction as well as a corresponding increase in roller temperature. Conveyor roller bearings deteriorate much faster during extended periods of this type of axle deflection. An additional problem occurs when using powered or driven rollers having grooves in which the drive belts ride. Forming these grooves may overstress the rollers and can undesirably preload the bearing when it is inserted in the end of the roller. Other preloading may result due to the manufacturing of the inner roller surface. Such preloading accelerates friction, wear and lockup of the bearing.

An additional drawback of conventional conveyor rollers is the clattering din they produce during periods of peak production which is quite objectionable. Increased legislative regulation of worker health and safety has given the goal of eliminating excessive noise.

Rollers have been constructed with polymeric material, however, the mere substitution of polymers for conventional metallic rollers and bearings has generated new difficulties, such as the inability of polymeric bearings to withstand insulative heat generated by friction produced during roller operation. Such heat buildup can accelerate friction, wear and lockup of the bearing.

An additional problem arises when utilizing axle supported rollers in wide conveyor applications where flexible items such as wide belts, paneling, film or strip material, and paper are conveyed. In such applications, it has been found desirable to employ flexible, polymeric rollers which provide an anti-static carrying surface for the conveyed sheet-like items, but use of the wide polymeric roller creates a sagging or drooping in the central portion of the roller due to the combined weight of the roller and its support axle. This sagging will cause the material being conveyed to erratically seek the higher portions of the roller where the material can be damaged at its sides by the structural framework of the conveyor. In addition, the support axle for the roller is subject to serious misalignment thus causing friction, wear and potential stoppage.

Thus, there is a definite need for a conveyor roller and bearing arrangement capable of low friction operation which cushions and absorbs roller and axle misalignment and keeps rolling friction losses to a minimum. There is also a need for a conveyor roller and bearing arrangement which compensates for normal manufacturing tolerances of the inner surface of the roller in order to avoid preloading the bearing excessively.

It is therefore a major objective of the present invention to provide a conveyor roller designed to rotate on a fixed axle and having internally mounted bearings capable of accepting the maximum of normally encountered axle misalignment without suffering a loss in bearing surface contact and a concomitant increase in friction.

Another objective of the present invention is to provide a conveyor roller bearing designed to generate a minimum amount of excess heat and to readily dissipate whatever amount of heat is generated.

It is a further objective of the invention to provide as internally and externally supported conveyor roller designed to substantially reduce the bending impulse or sagging in the central portion of a wide conveyor roller.

A still further objective of the present invention is to provide a conveyor roller which generates a minimum of operational noise.

Another objective of the present invention is to provide a conveyor roller which is self-lubricated.

SUMMARY OF THE INVENTION

The present invention discloses a conveyor roller designed to rotate on a stationary axle by means of internally mounted bearings located and mounted at each end of the roller and secured by a friction fit. The bearings are designed to cushion and absorb shock loading and preloading and maintain optimum surface contact between inner and outer races of the bearing. The present invention further discloses a conveyor roller having self-lubricating, heat dissipating and substantially silent-running properties, and which is designed to be readily mounted in a conveyor frame.

The conveyor roller and bearing arrangement of the present convention comprises a hollow, cylindrical roller, having two open ends into which a pair of bearing assemblies are mounted. Each bearing assembly has a hollow inner bearing race which surrounds and is keyed to the axle to prevent rotation but permit sliding movement of the inner bearing race on the axle. A hollow outer bearing race is rotatably mounted on the inner bearing race and has a flanged portion provided with cooling fins designed to dissipate heat in the live area of bearing contact. A hollow outer cushioning sleeve is secured in the end of the roller and to the outer bearing race so that the roller, outer bearing race and outer cushioning sleeve will freely turn on the inner bearing race which is fixed to the stationary axle.

It is desirable to optimize the surface contact between the inner and outer bearing races in the presence of heavy loading. Unlike the prior art, the present invention accomplishes this by designing the material and structure of the outer cushioning sleeve to be deformable upon application of forces subjected axially and radially of the roller or axle.

The cooperating geometry of the outer bearing race and outer cushioning sleeve further provides for a self-lubricating device. More particularly, a reservoir formed by ribs on the outer bearing race and passageways on the outer cushioning sleeve, communicates with channels on the outer cushioning sleeve to deliver lubricant to the live bearing surface between inner and outer bearing races.

By utilizing low friction polymeric materials for the inner and outer bearing races and outer cushioning sleeve, a quiet, high strength, low friction arrangement can be supplied.

The present invention also contemplates an improved conveyor roller designed to rotate between side support frame members on stationary stub axles by means of internally mounted bearings mounted in each end of the roller and an externally mounted roller support and bearing arrangement positioned between the side support frame members. The present invention further discloses a conveyor roller exhibiting corrosion resistant, antistatic characteristics, and which is designed to be durably mounted in a support frame.

It is desirable to maintain a straight line of roller surface contract when utilizing a wide conveyor roller. Contrasted with prior designs, the present invention achieves this due to the cushioning and support features provided by the cooperation of the bearing assemblies, stub axles and roller support arrangement. Further enhancements for use in extremely wide roller conveyor applications include a roller support arrangement for crowning the roller so as to insure centralized travel for the conveyed material.

BRIEF DESCRIPTION OF THE DRAWINGS

The invention and its many attendant objects and advantages will become better understood by reference to the following detailed description of the preferred embodiment when read in conjunction with the following drawings wherein:

FIG. 1 is a section elevation of the conveyor roller and bearing arrangement of the present invention;

FIG. 2 is a cross sectional view of the arrangement taken on line 2—2 of FIG. 1;

FIG. 3 is a cross sectional view of the arrangement taken on line 3—3 of FIG. 1;

FIG. 4 is a cross sectional view of the arrangement taken on line 4—4 of FIG. 1;

DETAILED DESCRIPTION OF THE PREFERRED EMBODIMENT

Figure 6:
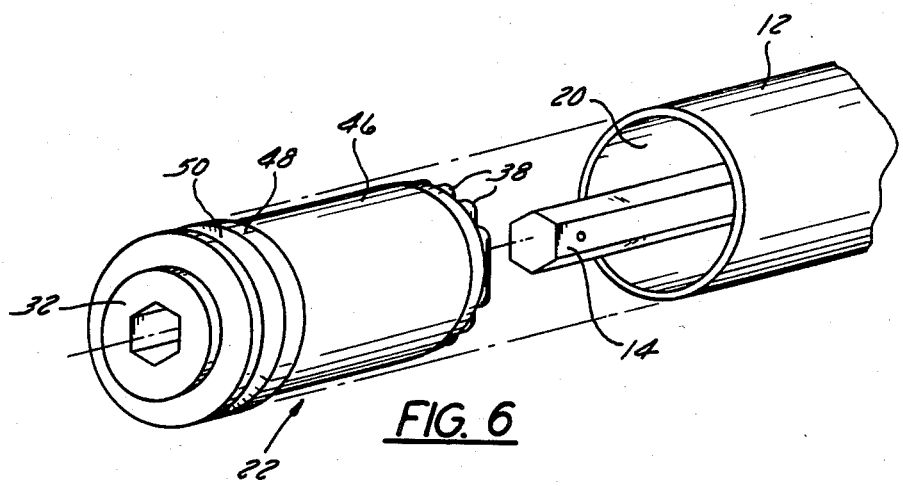
FIG. 6 is an exploded perspective view of the bearing assembly, axle and roller shown in the arrangement of FIG. 1.
Figure 7:
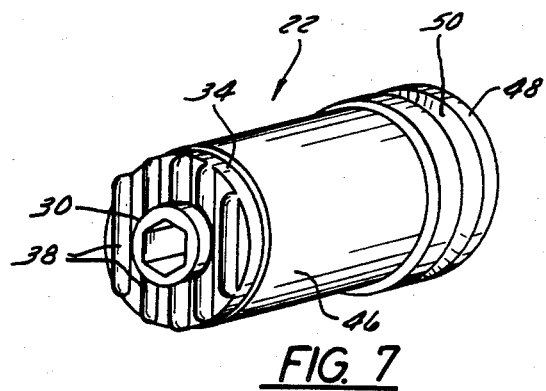
FIG. 7 is a reverse perspective view of the bearing assembly shown in FIG. 6.

Referring now to the drawings wherein like reference characters designate identical or corresponding parts, a conveyor roller and bearing arrangement 10 is best introduced through FIGS. 1 and 6, which illustrate a hollow, cylindrical, preferably metallic, roller 12 adapted for rotary movement about a stationary hexagonal axle 14. The axle 14 is fixed between spaced side support frame rails 16 by cotter pins 18 and prevented from rotation by a key fit within the rails 16. To allow free rotation of the roller 12 with respect to the axle 14, both open ends 20 of the roller 12 are fitted with a plastic bearing assembly 22.

Each of the bearing assemblies 22 includes three hollow pieces, namely, an inner bearing race 24, and outer bearing race 26 and an outer cushioning sleeve 28. The inner bearing race 24 has a cylindrical portion 30 joined to an annular flange 32, and surrounds and is slidably keyed to the stationary axle 14. The outer bearing race 26 is constructed with an annular flange 34 and a cylindrical portion 36, the inner surface of which is adapted for rotation to provide a low friction running fit on the cylindrical portion 30 of the inner bearing race 24. Formed on the face of the flange 34 is a plurality of outwardly projecting cooling fins 38 designed to conduct heat generated by the inherent friction produced by operation of the conveyor roller away from the bearing assembly for radiated dissipation through the roller 12. In order to provide engagement with the outer cushioning sleeve 28, the outer surface of the cylindrical portion 36 is provided with a series of axially extending, circumferentially spaced ribs 42 having side walls diverging outwardly from the surface 36. Certain of these ribs 42 are cut with a channel 44 for delivering lubricant between the inner and outer bearing races 24, 26, as will be described later.

The composition of races 24, 26 may be of any number of suitable materials but preferably should be similar polymeric materials exhibiting a high surface hardness for low wear, low friction levels to keep heat at a minimum, high load bearing capacity and high sheer strength.

Figure 5:
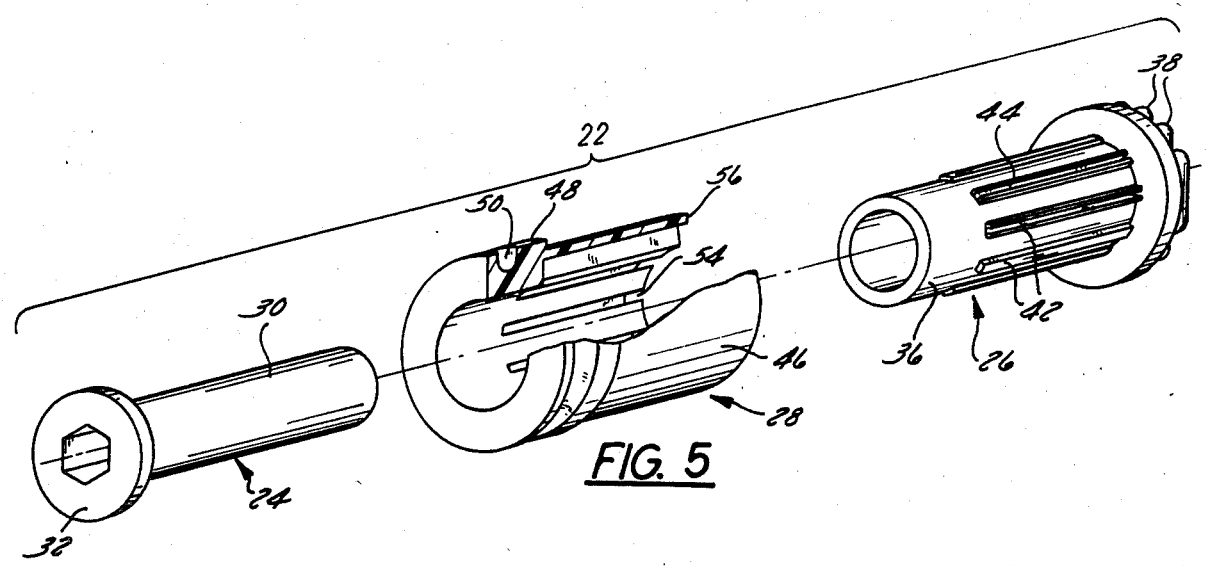
FIG. 5 is an exploded perspective view of the bearing assembly shown in the arrangement of FIG. 1.

Turning now to the construction of outer cushioning sleeve 28, the exterior surface 46 is generally cylindrical and designed to be press fitted into the open end 20 of the roller 12. For driven or powered roller applications, sleeve 28 has an enlarged collar 48 into which is preferably formed a groove 50 adapted to be engaged by a belt or O-ring 52 driven by a motor (not shown). Alternately, the collar 48 could be fashioned as a two piece sprocket assembly to be driven by a chain. Obviously, the groove or sprocket would not be necessary on gravity type rollers. As best seen in FIGS. 3 and 5, the sleeve 28 is structured internally with a series of axially extending, circumferentially spaced passageways 54, having side walls which are outwardly divergent toward and an end wall generally parallel to the exterior surface 46. The side walls of the passageways 54 are sized for press fit, frictional engagement with the complementary side walls of ribs 42 on outer bearing race 26. More specifically, during assembly, the ribs 42 of outer bearing race 26 are axially slidable into the lower side wall portions of the passageways 54 of outer sleeve 28 until engagement of the flange 34 with the end 56 of the sleeve 28 occurs. Since the sleeve 28 is connected to outer bearing race 26 and is fit into the roller, the sleeve 28, outer bearing race 26 and roller 12 will all rotate freely upon the inner bearing race 24 which is keyed to the stationary axle 14. In assembled form, the arrangement provides communication between the inner and outer bearing race surfaces and certain of the passageways 54 aligned with the channels 44. As a feature of the invention, certain of these passageways 54 cooperate at one end with the collar 48 and at the other end with flange 34 to provide reservoirs for holding lubricant which when heated due to elevated bearing temperatures from increased loading will flow with changed viscosity through channels 44 to the interface of races 24, 26 and thereby maintain the sliding friction losses low.

As a distinct advantage of the present invention, the sleeve 28 is made of polymeric material different from that of races 24, 26 in possessing a softness which will allow limited deformation or "cushioning" of the sleeve portions or lands forming the end and side walls of the passageways 54 when the roller 12 is subjected to either impact loading forces or preload forces due to manufacturing tolerances of the inner surface of the roller. Otherwise stated, the material, shape and geometry of this cushioning arrangement enables proper axial alignment of the inner and outer bearing races 24, 26 even when the axle 14 and roller 12 are dynamically or statically loaded.

In assembly, outer bearing race 26 and outer cushioning sleeve 28 are slidably engaged to bring end 56 slightly apart from flange 34 so that lubricant can be shot in the channels 44. The outer bearing race 26 and sleeve 28 are then quickly closed together and the inner bearing race 24 is inserted through the race-sleeve unit 26, 28. The three piece bearing assembly 22 is then keyed onto axle 14 and press fit into each end 20 of the roller 12 after which the axle 14 can be secured to the rails 16.

The arrangement as assembled allows the inner bearing race 24 a limited degree of free axial movement on the axle 14 to ensure the bearing assemblies 22 are not loaded axially one relative to the other. In FIG. 1, the annular flange 32 has a limited outward travel defined by engagement with the frame rail 16 and limited inward travel is defined by engagement of the flange 32 with the mouth 58 of the fixed outer bearing race 26. It should be noted however that even in its outermost position, the inner race 24 is designed with a length on its cylindrical portion 30 which will allow for continuous contact with the axial of outer race 26. Additionally, the outer diameter of the annular flange 34 is less than the inner diameter of the roller 12 so as to prevent jamming of the bearing assembly 22.

Thus, the present invention furnishes a conveyor roller and bearing arrangement which is designed to cushion and absorb misalignment of the axle 14 and roller 12 and maintain optimum surface contact between the inner and outer bearing races 24, 26 throughout impact loading or preloading. The arrangement further provides a low friction operation, enables dissipation of heat buildup, and allows self-lubrication during operation only as required.

Figure 8:
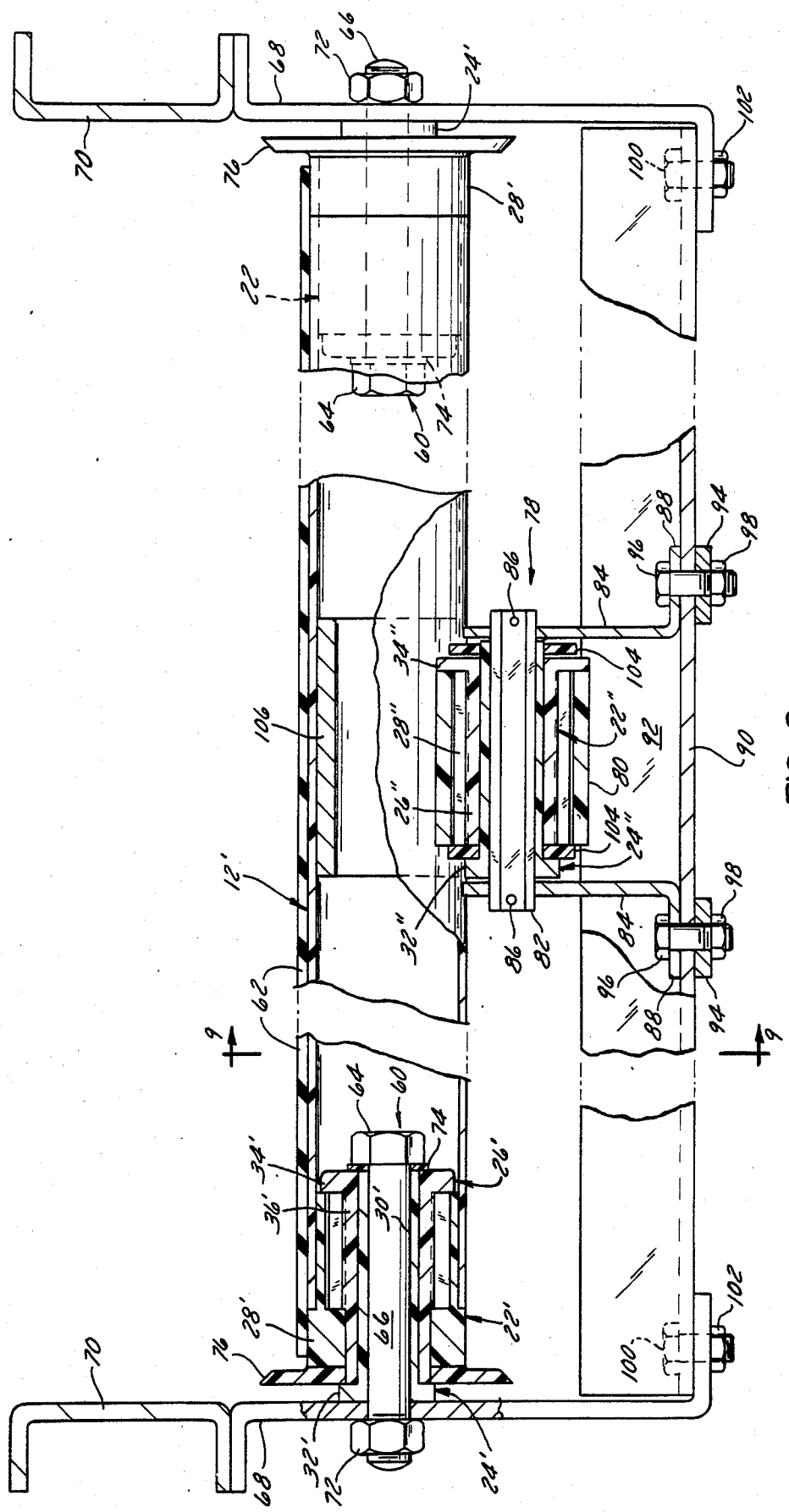
FIG. 8 is a section elevation of an alternate embodiment of the conveyor roller and bearing arrangement of the present invention.
Figure 9:
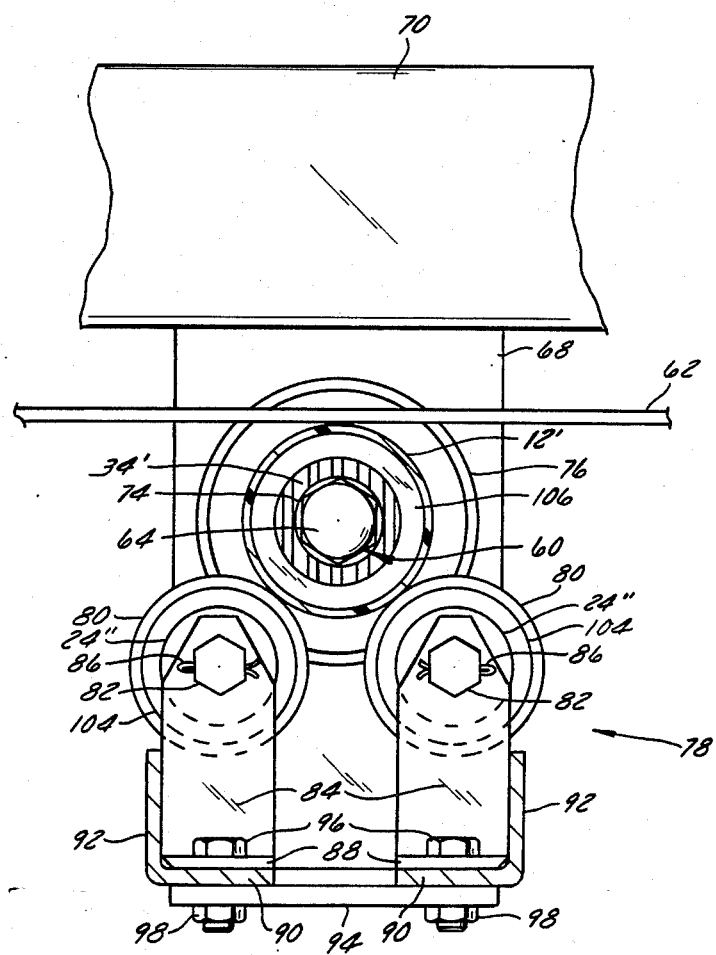
FIG. 9 is a cross-sectional view of the arrangement taken on line 9—9 of FIG. 8.
Figure 10:
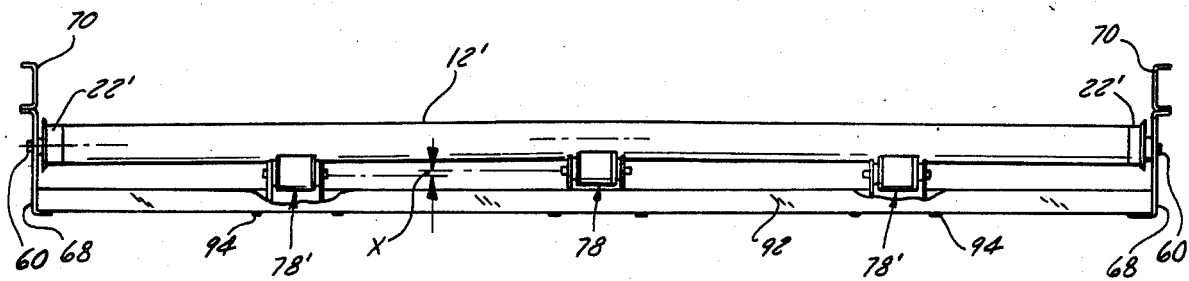
FIG. 10 is a section elevation of an alternate embodiment of the conveyor roller and bearing arrangement of the present invention.

FIGS. 8 through 10 illustrate alternate embodiments of the conveyor roller and bearing arrangement shown in FIGS. 1-7. Prime numbers are used in these figures to indicate elements of the alternate embodiments which generally correspond to previously numbered elements appearing in FIG. 1.

FIG. 8 depicts a conveyor roller and bearing arrangement particularly useful in the conveying of wide flexible items such as belts, paneling, film or strip material, paper or the like. Such items are desirably carried upon a wide, tubular roller 12' supported for rotary movement about stationary, hexagonal stub shafts or axles 60. The roller in this application is preferably of an anti-corrosive, flexible, polymeric construction having an anti-static contact surface to minimize static electricity problems which may be present when conveying sheetlike material. In a preferred embodiment, the roller 12' is shown as being driven with a belt 62 although other live or gravity roller type arrangements may be utilized. To allow free rotation of the roller 12' on the axles 60, both ends of the roller 12' are provided with a plastic bearing assembly 22' as substantially previously described.

Each of the bearing assemblies 22' include three hollow elements namely, an inner bearing race 24', an outer bearing race 26' and an outer cushioning sleeve 28'. The inner bearing race 24' has a cylindrical portion 30' joined to an annular flange 32', and surrounds and is slidably keyed to the axle 60. The outer bearing race 26' is constructed with an annular flange 34' and a cylindrical portion 36', the inner surface of which is adapted for rotation to provide a low friction running fit on the portion 30' of the inner bearing race 24'. The outer cushioning sleeve 28' is designed to be press fitted into the end of the roller 12' and frictionally engages the walls of outer bearing race 26' in the manner as described in the embodiment of FIG. 1 so as to enable proper axial alignment of the races 24', 26' even when the shafts 60 and roller 12 are under load.

Each of the stub axles 60 has an enlarged hexagonal head 64 and a stem portion 66 which in keyed relationship passes through both the inner race 24' and a mounting bracket 68 secured under the conveyor frame 70. The end of each stub axle 60 is threaded to receive a nut 72 which is tightened up against the bracket 68 to hold the bearing assembly 22' firmly in place. At the inner end of each bearing assembly 22', a lock washer 74 is provided between the flange 34' on the outer race 26' and the head 64 of the stub axle 60. Outermost of each bearing assembly 22', a guide washer 76 for guiding conveyed material encircles the outer race 26' and is held fixed between the flange 32' of the inner race 24' and the outer cushioning sleeve 28'.

In order to provide additional support for the roller 12', a support roller assembly 78 is provided exteriorly and centrally of the roller 12'. In the preferred embodiment, only one support roller assembly 78 is employed but it should be understood that depending on the length and diameter of and loading on the roller, any desired number of support roller assemblies 78 may be used to maintain the roller surface straight as it addresses the conveyed product. With further reference to FIG. 9, the support roller assembly 78 includes a pair of guide rollers 80 which are parallel to and spaced apart from each other and contact the lower portion of the roller 12'. Each guide roller 80 is fitted upon a bearing assembly 22" having an inner bearing race 24", an outer bearing race 26" and a shortened outer cushioning sleeve 28', all of which cooperate as aforedescribed. A shaft 82 passes in keyed relationship through both inner race 24" and spaced, support brackets 84, and is fixed between these brackets by cotter pins 86. Support brackets 84 are securely anchored at their lower ends 88 to the foot portions 90 of support angles 92, as well as to cross straps 94 which join the angles 92, by bolts 96 and nuts 98. The ends of the support angles 92 are in turn connected to the support brackets 68 by bolts 100 and nuts 102. On the support roller assembly 78, plastic washers 104 encircle the inner race 24" and are held at one end between the flange 34" of the outer race 26" and the support bracket 84. At the other end of assembly 78, washers 104 are retained between flange 32' of the inner race 24" and the end surfaces of the roller 80, outer cushioning sleeve 28" and outer race 26". To enable further support a reinforcing stiffener 106 is provided internal to the roller 12' in the area where the support roller assembly 78 contacts the roller 12' to reduce compression of the roller 12' from guide rollers 80 under heavier loading.

With the arrangement described, wide, flexible material being conveyed on a wide roller maintains a straight line path, and due to the minimizing of roller sag, does not tend to move erratically toward the higher portions of the roller contact surface so that the material being conveyed will not be damaged at the sides of the conveyor.

FIG. 10 illustrates a further alternate embodiment wherein an extremely wide conveyor roller and bearing arrangement is utilized under heavy loading conditions. For example, such an arrangement might typically employ a plastic roller 12' having a length of 120 inches, a diameter of 2.5 inches and a roller thickness of 0.120 inches with the roller subject to maximum loading of 125 pounds. In this particular application, it is desirable to utilize three support roller assemblies 78, 78' spaced equidistantly apart from each other. As a further improvement of the embodiment shown in FIGS. 8 and 9, the center of the roller contact surface is raised or crowned slightly above the ends of the roller 12' to insure that wide, flexible conveyed products will, in matching the contacting surface, tend to centralize themselves and thus remain in the desired central location on the roller carrying surface. Such behavior is known in the conveying art as "training" the conveyed material so as to keep the conveyed material from contacting the side support frame and damaging the sides of the material. To provide this behavior in such application, the center support assembly 78 is positioned a slight distance, "X" higher than the flanking roller support assemblies 78'. Owing to the flexibility of its preferred plastic construction, the roller 12' is easily maintained in this centered high or crowned position while rotating underload due to the particular location of the subject roller assembly 78. Even though the stub axles 60 may be misaligned 1°-3°, the bearing assemblies 22' in the roller 12' provide a cushioning effect to maintain optimum surface contact between the inner and outer bearing races 24', 26' throughout loading. Thus, this arrangement also provides a low friction operation with reduced wear and stoppage problems.

Unlike other previous designs utilizing wide conveyor rollers subject to sagging or drooping in their center area, the arrangements just described substantially reduce the bending moment or impulse of the roller due to the cushioning and support enhancements provided by the cooperation of the bearing assemblies 22', stub axles 60 and support roller assembly 78, 78'.

The present invention thus also provides a conveyor roller and bearing arrangement, particularly well suited for wide conveyor roller applications, which features a combined internal and external support geometry for a conveyor roller so that optimum efficiency in conveying wide, flexible items is achieved. The arrangement also furnishes a corrosion resistant, anti-static operation with more durable support than previously known.

While a particular embodiment of this roller and bearing arrangement has been shown and described, it will be obvious to persons skilled in the art that changes and modifications might be made without departing from the invention in its broader aspects. It is the aim of the dependent claims to cover all such changes and modifications as fall within the true scope and spent of the invention.

What is claimed is:

1. A conveyor roller and bearing arrangement adapted for rotary movement between spaced, side support frame members comprising:
   a tubular roller having open ends;
   a bearing assembly mounted in each end of said roller;
   a stub axle at each end of said roller extending through said bearing assembly and said frame member; and
   means located between said frame members for supporting said roller externally thereof and including at least one guide roller engageable with the lower portion of said roller, said roller being provided internally with a reinforcing stiffener in the area where said guide roller is engageable with said roller, said bearing assemblies and said stub axles cooperable with said means for supporting said roller to reduce the bending movement of said roller under load.

2. A conveyor roller and bearing arrangement as defined in claim 1 wherein each of said stub axles is fixed between said bearing assembly and said frame member.

3. A conveyor roller and bearing arrangement as defined in claim 1 wherein said roller and said bearing assemblies are constructed of polymeric material and said stub axles are formed of metal.

4. A conveyor and bearing arrangement as defined in claim 1, said means for supporting said roller enabling the central portion of said roller to be slightly higher than the ends of said roller.

5. A conveyor roller and bearing arrangement as defined in claim 1 wherein the means for supporting said roller are dependent upon the length and diameter of and the loading upon said roller.

6. A conveyor roller and bearing arrangement as defined in claim 1, said means for supporting said roller being mounted to support angles, said angles being fixed to said support frame members.

7. A conveyor roller and bearing arrangement adapted for rotary movement between spaced, side support frame members, comprising:
   a tubular, flexible roller having open ends;
   a stub axle at each end of said roller extending through one of said support frame members;
   means mounted on a shaft and located between said support frame members for supporting said roller centrally thereof; and
   bearing means fixed in the ends of said roller and in said means for supporting said roller, said bearing means having an inner bearing race rotatably fixed on said stub axles and said shaft, an outer bearing race rotatably mounted on said inner bearing race, and an outer cushioning sleeve fixed to said outer bearing race, said sleeve being constructed and arranged to maintain bearing contact between said inner and outer races upon misalignment of said roller, axles and shaft due to uneven loading thereon.

8. A conveyor roller and bearing arrangement as defined in claim 7 wherein said means for supporting said roller comprises at least one pair of spaced apart, parallel guide support rollers which are engageable with the lower portion of said roller.

9. A conveyor roller and bearing arrangement as defined in claim 8 wherein said means for supporting said roller comprises three pairs of spaced apart, parallel guide rollers.

* * * * *